(12) United States Patent
Beaucoup et al.

(10) Patent No.: US 7,130,797 B2
(45) Date of Patent: Oct. 31, 2006

(54) ROBUST TALKER LOCALIZATION IN REVERBERANT ENVIRONMENT

(75) Inventors: Franck Beaucoup, Dunrobin (CA); Michael Tetelbaum, Ottawa (CA)

(73) Assignee: Mitel Networks Corporation, Ottawa (CA)

( * ) Notice: Subject to any disclaimer, the term of this patent is extended or adjusted under 35 U.S.C. 154(b) by 831 days.

(21) Appl. No.: 10/222,941

(22) Filed: Aug. 15, 2002

(65) Prior Publication Data
US 2003/0051532 A1 Mar. 20, 2003

(30) Foreign Application Priority Data
Aug. 22, 2001 (GB) .................. 0120450.2

(51) Int. Cl.
G10L 15/20 (2006.01)
G10L 21/02 (2006.01)
(52) U.S. Cl. ........................... 704/233; 704/215
(58) Field of Classification Search ................ 704/233, 704/215, 232
See application file for complete search history.

(56) References Cited

U.S. PATENT DOCUMENTS 4,581,758 A * 4/1986 Coker et al. ................. 381/56
5,778,082 A * 7/1998 Chu et al. ..................... 381/92
6,469,732 B1 * 10/2002 Chang et al. ............. 348/14.08

FOREIGN PATENT DOCUMENTS

WO WO 85/02022 5/1985
WO WO 00/28740 5/2000

OTHER PUBLICATIONS

Huang et al., "A Biomimetic System for Localization and Separation of Multiple Sound Sources," IEEE Transactions on Instrumentation and Measurement, vol. 44, No. 3, Jun. 1995, pp. 733-738.*
Jan et al., "Microphone Arrays for Speech Processing," IEEE International Symposium on Signals, Systems and Electronics, Oct. 1995.*
Rabinkin et al., "A DSP Implementation of Source Location Using Microphone Arrays", J. Acous. Soc. Am., vol. 99, No. 4 Pt. 2, p. 2503, Apr. 1996.*
Strobel et al., "Classification of time-delay estimates for robust speaker localization," in Proc. ICASSP Phoenix, AZ, Mar. 1999, pp. VI-3081-VI-3084.*

* cited by examiner

*Primary Examiner*—V. Paul Harper
(74) *Attorney, Agent, or Firm*—Beyer Weaver & Thomas, LLP

(57) ABSTRACT

A method of locating a talker in a reverberant environment comprises receiving multiple audio signals from a microphone array that include direct path audio signal and reverberation signal components. The direct path audio signal components of the multiple audio signals are detected and are used to weight the multiple audio signals. A position estimate based on the weighted audio signals is then calculated. Periods of speech activity are detected and a final position estimate is generated during the periods of speech activity.

9 Claims, 10 Drawing Sheets

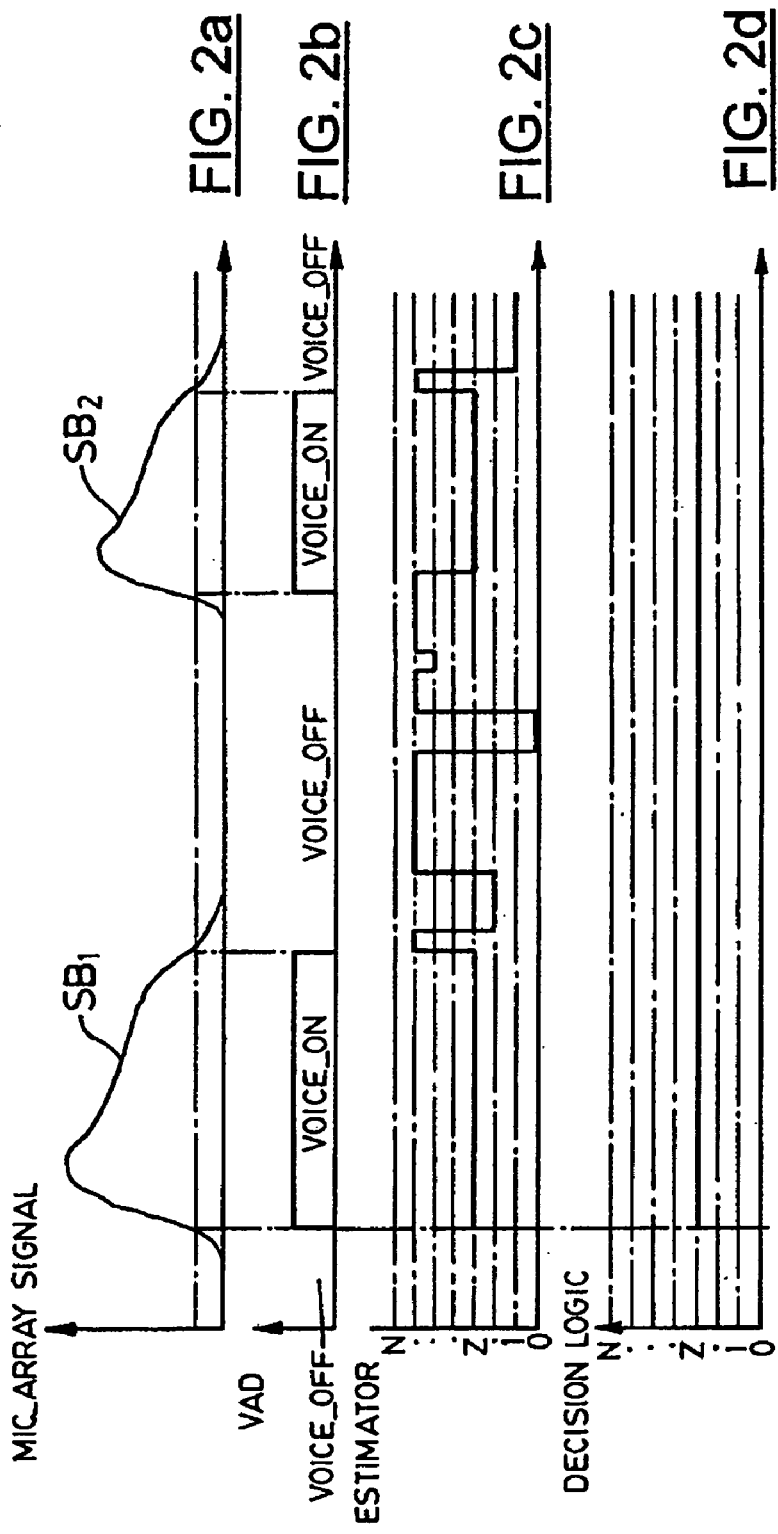

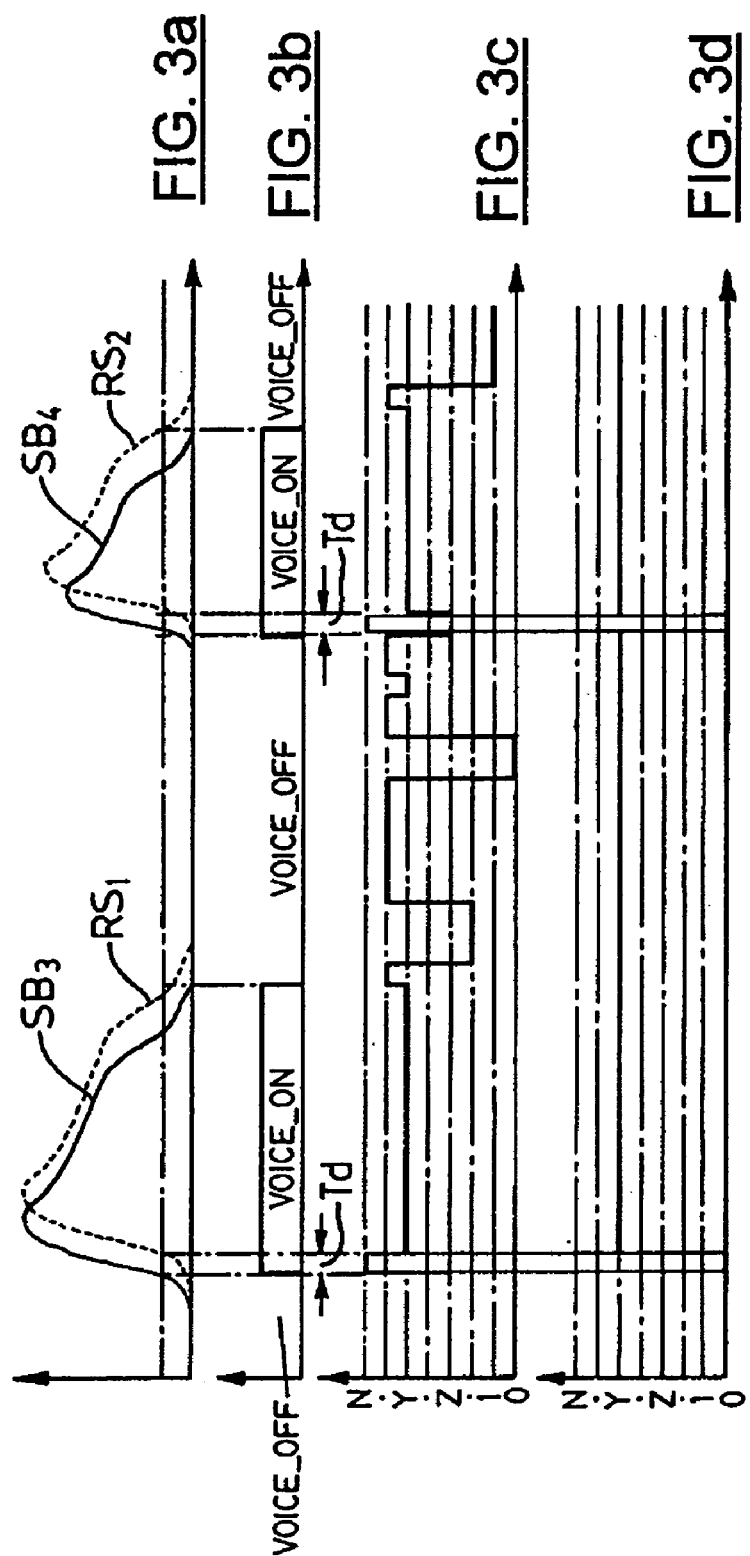

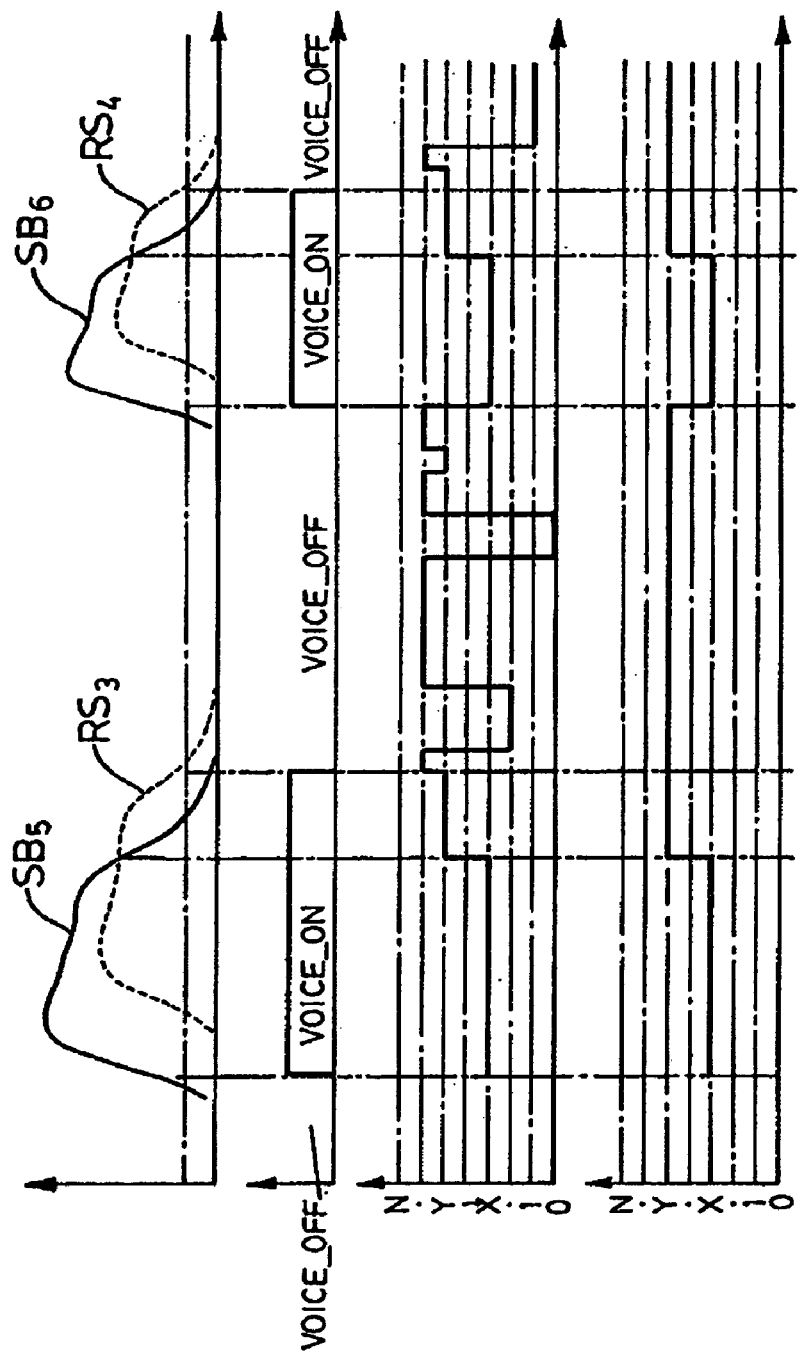

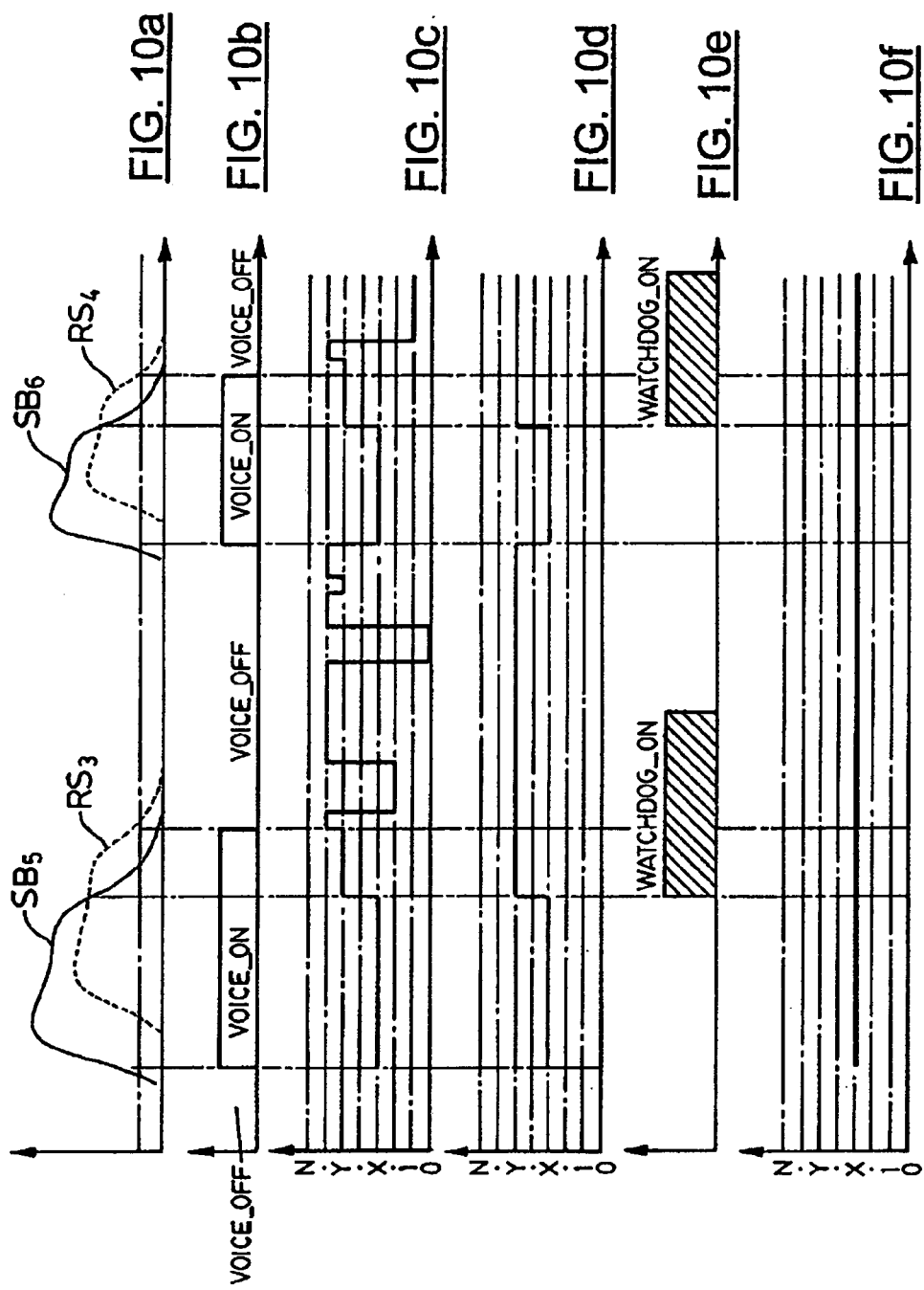

ROBUST TALKER LOCALIZATION IN REVERBERANT ENVIRONMENT

FIELD OF THE INVENTION

The present invention relates generally to audio systems and in particular to a method and system for improving talker localization in a reverberant environment.

BACKGROUND OF THE INVENTION

Localization of audio sources is required in many applications, such as teleconferencing, where the audio source position is used to steer a high quality microphone towards the talker. In video conferencing systems, the audio source position may additionally be used to steer a video camera towards the talker.

It is known in the art to use electronically steerable arrays of microphones in combination with location estimator algorithms to pinpoint the location of a talker in a room. In this regard, high quality and complex beamformers have been used to measure the power at different positions. In such systems, location estimator algorithms locate the dominant audio source using power information received from the beamformers. The foregoing prior art methodologies are described in *Speaker localization using a steered Filter and sum Beamformer, N. Strobel, T. Meier, R. Rabenstein*, presented at the Erlangen work shop 99, vision, modeling and visualization, Nov. 17–19th, 1999, Erlangen, Germany.

U.K. Patent Application No. 0016142 filed on Jun. 30, 2000 for an invention entitled "Method and Apparatus For Locating A Talker" discloses a talker localization system that includes an energy based direction of arrival (DOA) estimator. The DOA estimator estimates the audio source location based on the direction of maximum energy at the output of the beamformer over a specific time window. The estimates are filtered, analyzed and then combined with a voice activity detector to render a final position estimate of the audio source location.

In highly reverberant environments, reflected acoustic signals can result in miscalculation of the direction of arrival of the audio signals generated by the talker. This is due to the fact that the energy of the audio signals picked up by the beamformer can be stronger in the direction of the reverberation signals than for the direct path audio signals. The effects of reverberation have most impact on audio source localization at the beginning and the end of a speech burst. Miscalculation of the direction of arrival of the audio signals at the beginning of a speech burst can be caused by a strong reverberation signal having a short delay path. As a result, the direct path audio signal may not have dominant energy for a long enough period of time before being masked by the reverberation signal. In this situation, the DOA estimator can miss the beginning of the speech burst and lock on to the reverberation signal. Miscalculation of the direction of arrival of the audio signals at the end of a speech burst can caused by a reverberation signal that masks the decaying tail of the direct path audio signal resulting in beam steering in the wrong direction until the next speech burst occurs.

In an attempt to deal with the effects of reverberation during talker localization, two approaches have been considered. One approach uses a priori knowledge of the room geometry and the reverberation (interference) and noise sources therein. Different space regions within the room are pre-classified as containing a reverberation or noise source. The response of the beamformer is then minimized at locations corresponding to the locations of the pre-classified reverberation and noise sources.

The second approach uses a computationally complex Crosspower Spectrum Phase (CPS) analysis to calculate Time Delay Estimates (TDE) between the microphones of the microphone array. Unfortunately, it is known that performance of TDE methods degrade dramatically in the highly reverberant conditions.

As will be appreciated, the above-described approaches to deal with the effects of reverberation suffer disadvantages. Accordingly, a need exists for an improved method for talker localization in a reverberant environment. It is therefore an object of the present invention to provide a novel method and system for talker localization in a reverberant environment.

SUMMARY OF THE INVENTION

Accordingly, in one aspect of the present invention there is provided a method of locating a talker in a reverberant environment comprising the steps of:

receiving multiple audio signals from a microphone array, said audio signals including direct path audio signal and reverberation signal components;

calculating position estimates of a source of said audio signals based on said audio signals;

rapidly detecting the direction of the direct path audio signal component of said multiple audio signals based on said calculated position estimates;

using the rapidly detected direction to weight the calculated position estimates;

detecting periods of speech activity; and generating a final position estimate of said source during said periods of speech activity based on the weighted position estimates.

According to another aspect of the present invention there is provided a method of locating a talker in a reverberant environment comprising the steps of:

receiving multiple audio signals from a microphone array, said audio signals including direct path audio signal and reverberation signal components;

calculating position estimates of a source of audio signals based on the audio signals received from said microphone array;

detecting periods of speech activity;

generating a final position estimate of said source during said periods of speech activity based on said position estimates; and inhibiting the final position estimate from being changed if no interval of silence separates the calculated position estimates.

According to yet another aspect of the present invention there is provided a talker localization system comprising:

a microphone array receiving multiple audio signals, said audio signals including direct path audio signal and reverberation signal components;

an estimator calculating position estimates of a source of said audio signals based on said audio signals;

an early detect module rapidly detecting the direction of the direct path audio signal component of said multiple audio signals based on said calculated position estimates;

a weighting module using the rapidly detected direction to weight the calculated position estimates;

a voice activity detector detecting periods of speech activity; and decision logic generating a final position estimate of said source during said periods of speech activity based on the weighted position estimates.

According to still yet another aspect of the present invention there is provided a talker localization system comprising:

a microphone array receiving multiple audio signals, said audio signals including direct path audio signal and reverberation signal components;

an estimator calculating position estimates of a source of audio signals based on the audio signals received from said microphone array;

a voice activity detector detecting periods of speech activity; and decision logic generating a final position estimate of said source during said periods of speech activity based on said position estimates and inhibiting the final position estimate from being changed if no interval of silence separates the calculated position estimates.

The present invention provides advantages in that talker localization in reverberant environments is achieved without requiring a priori knowledge of the room geometry including the reverberation and noise sources therein and without requiring complex computations to be carried out.

BRIEF DESCRIPTION OF THE DRAWINGS

Embodiments of the present invention will now be described more fully with reference to the accompanying drawings in which:

FIG. 1b is a state machine of the decision logic of FIG. 1a;

FIG. 2a shows an audio signal energy envelope including two speech bursts in a non-reverberant environment;

FIG. 2b shows the output of the voice activity detector of FIG. 1a generated in response to the audio signal energy envelope of FIG. 2a;

FIG. 2c shows the output of the estimator of FIG. 1a generated in response to the audio signal energy envelope of FIG. 2a;

FIG. 2d shows the position estimate output of the decision logic of FIG. 1a generated in response to the output of the voice activity detector and estimator;

FIG. 3a shows an audio signal energy envelope including two speech bursts and accompanying reverberation signals due to a reverberant environment;

FIG. 3b shows the output of the voice activity detector of FIG. 1a generated in response to the audio signal energy envelope of FIG. 3a;

FIG. 3c shows the output of the estimator of FIG. 1a generated in response to the audio signal energy envelope of FIG. 3a;

FIG. 3d shows the position estimate output of the decision logic of FIG. 1a generated in response to the output of the voice activity detector and estimator;

FIG. 4a shows an audio signal energy envelope including two speech bursts and accompanying reverberation signals due to a moderate reverberant environment;

FIG. 4b shows the output of the voice activity detector of FIG. 1a generated in response to the audio signal energy envelope of FIG. 4a;

FIG. 4c shows the output of the estimator of FIG. 1a generated in response to the audio signal energy envelope of FIG. 4a;

FIG. 4d shows the position estimate of the decision logic of FIG. 1a generated in response to the output of the voice activity detector and estimator after filtering;

FIGS. 10a to 10d are identical to FIGS. 4a to 4d;

FIG. 10e shows the timing of a watchdog timer forming part of the decision logic of FIG. 9; and FIG. 10f shows the position estimate output of the decision logic of FIG. 9.

DETAILED DESCRIPTION OF THE PREFERRED EMBODIMENTS

The present invention relates to a talker localization system and method that is robust in reverberant environments without requiring a priori knowledge of the room geometry and the reverberation and noise sources therein and without requiring complex computations to be carried out. The direction of direct path audio is rapidly detected and the direction is used to weight position estimates output to the decision logic. The decision logic is also inhibited from switching position estimate direction if no interval of silence separates a change in position estimates received by the decision logic. For better understanding, a talker localization system that is accurate in low reverberant environments will firstly be described.

Figure 1A:
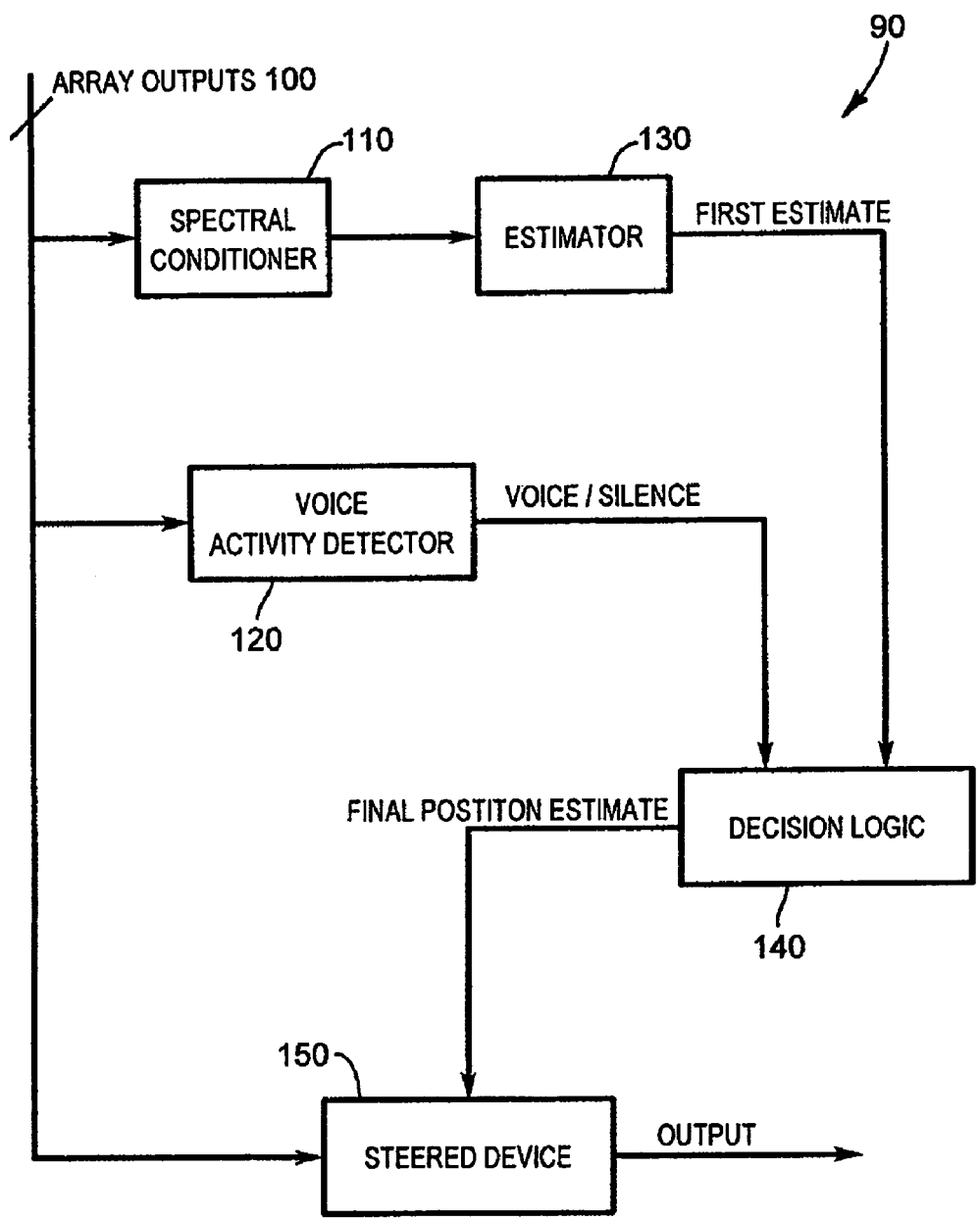
FIG. 1a is a schematic block diagram of a prior art talker localization system including a voice activity detector, an estimator and decision logic.

Turning now to FIG. 1a, a talker localization system that is accurate in low reverberant environments such as that described in U.K. Patent Application No. 0016142 filed on Jun. 30, 2000 is shown and is generally identified by reference numeral 90. As can be seen, talker localization system 90 includes an array 100 of omni-directional microphones, a spectral conditioner 110, a voice activity detector 120, an estimator 130, decision logic 140 and a steered device 150 such as for example a beamformer, an image tracking algorithm, or other system.

The omni-directional microphones in the array 100 are arranged in circular microphone sub-arrays, with the microphones of each sub-array covering segments of a 360° array. The audio signals output by the circular microphone sub-arrays of array 100 are fed to the spectral conditioner 110, the voice activity detector 120 and the steered device 150.

Spectral conditioner 110 filters the output of each circular microphone sub-array separately before the output of the circular microphone sub-arrays are input to the estimator 130. The purpose of the filtering is to restrict the estimation procedure performed by the estimator 130 to a narrow frequency band, chosen for best performance of the estimator 130 as well as to suppress noise sources.

Estimator 130 generates first order position or location estimates, by segment number, and outputs the position estimates to the decision logic 140. During operation of the estimator 130, a beamformer instance is "pointed" at each of the positions (i.e. different attenuation weightings are applied to the various microphone output audio signals). The position having the highest beamformer output is declared to be the audio signal source. Since the beamformer instances are used only for energy calculations, the quality of the beamformer output signal is not particularly important. Therefore, a simple beamforming algorithm such as for example, a delay and sum beamformer algorithm, can be used, in contrast to most teleconferencing implementations, where high quality beamformers executing filter and sum beamformer algorithms are used for measuring the power at each position.

Voice activity detector 120 determines voiced time segments in order to freeze talker localization during speech pauses. The voice activity detector 120 executes a voice activity detection (VAD) algorithm. The VAD algorithm processes the audio signals received from the circular microphone sub-arrays and generates output signifying the presence or absence of voice in the audio signals received from the circular microphone sub-arrays. The output of the VAD algorithm is then used to render a voice or silence decision.

Figure 1B:
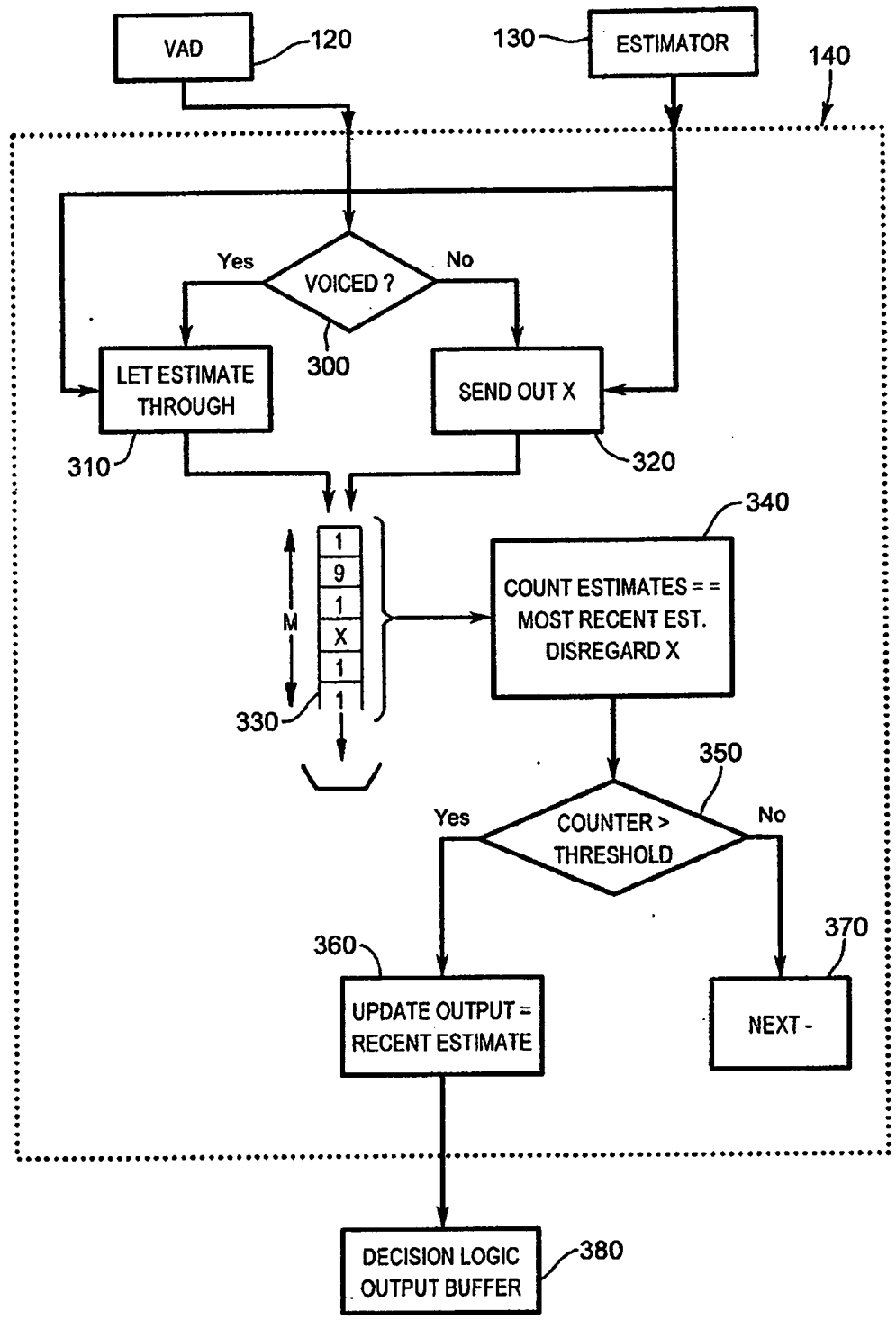

Decision logic 140 is better illustrated in FIG. 1b and as can be seen, decision logic 140 is a state machine that uses the output of the voice activity detector 120 to filter the position estimates received from estimator 130. The position estimates received by the decision logic 140 when the voice activity detector 120 generates silence decision logic output (i.e. during pauses in speech), are disregarded (steps 300 and 320). Position estimates received by the decision logic 140 when the voice activity detector 120 generates voice decision logic output are stored (step 310) and are then subjected to a verification process. During the verification process, the decision logic 140 waits for the estimator 130 to complete a frame and repeat its position estimate a threshold number of times, n, including up to m<n mistakes.

A FIFO stack memory 330 stores the position estimates. The size of the FIFO stack memory 330 and the minimum number n of correct position estimates needed for verification are chosen based on the voice performance of the voice activity detector 120 and estimator 130. Every new position estimate which has been declared as voiced by activity detector 120 is pushed into the top of FIFO stack memory 330. A counter 340 counts how many times the latest position estimate has occurred in the past, within the size restriction M of the FIFO stack memory 330. If the current position estimate has occurred more than a threshold number of times, the current position estimate is verified (step 350) and the estimation output is updated (step 360) and stored in a buffer (step 380). If the counter 340 does not reach the threshold n, the counter output remains as it was before (step 370). During speech pauses no verification is performed (step 300), and a value of 0xFFFF(xx) is pushed into the FIFO stack primary 330 instead of the position estimate. The counter output is not changed.

The output of the decision logic 140 is a verified final position estimate, which is then used by the steered device 150. If desired, the decision logic 140 need not wait for the estimator 130 to complete frames. The decision logic 140 can of course process the outputs of the voice activity detector 120 and estimator 130 generated for each sample.

Turning now to FIGS. 2a to 2d, an example of how the talker localization system 90 determines the audio source location of a single talker that is located in the Z direction assuming no noise or reverberation sources are present is shown. As can be seen, FIG. 2a illustrates an audio signal energy envelope including two speech bursts $SB_1$ and $SB_2$ picked up by the array 100 and fed to the voice activity detector 120 and estimator 130. When the voice activity detector 120 receives the speech bursts, the speech bursts are processed by the VAD algorithm. FIG. 2b illustrates the output of the voice activity detector 120 indicating detected voice and silence segments of the audio signal energy envelope. FIG. 2c illustrates the output of the estimator 130, where N is the number of equally spaced segments, each having a size equal to $2\pi/N$. The position estimates generated by the estimator 130 during the silence periods are derived from background noise and therefore may vary from one time point to another. FIG. 2d illustrates the audio source location result (final position estimate) generated by the decision logic 140 in response to the output of the voice activity detector 120 and estimator 130.

Turning now to FIGS. 3a to 3d, an example of how the talker localization system 90 attempts to determine the audio source location of a single talker in a reverberant environment is shown. As can be seen, FIG. 3a illustrates an audio signal energy envelope including two speech bursts $SB_3$ and $SB_4$ accompanied by two reverberation signals $RS_1$ and $RS_2$. The two speech bursts $SB_3$ and $SB_4$ are assumed to arrive at the array 100 from the Z direction while the reverberation signals are assumed to arrive at the array 100 from the Y direction. FIG. 3b illustrates the output of the voice activity detector 120 indicating detected voice and silence segments of the audio signal energy envelope. FIG. 3c illustrates the output of the estimator 130. As can seen, the estimator 130 classifies the speech bursts $SB_3$ and $SB_4$ as an audio source location for the interval Td. FIG. 3d illustrates the audio source location result generated by the decision logic 140 in response to the output of the voice activity detector 120 and estimator 130. Although the estimator 130 classifies the speech bursts $SB_3$ and $SB_4$ as the audio source location for the interval Td, the interval Td is not sufficient for the decision logic 140 to select the Z direction as the valid audio source location. Since the reverberation signals $RS_1$ and $RS_2$ have dominant energy most of the time, the decision logic 140 incorrectly selects the Y direction as the valid audio source location.

FIG. 4a illustrates an audio signal energy envelope in a moderate reverberant environment that may result in incorrect position estimates being generated by the talker localization system 90. As can be seen, the audio signal energy envelope includes two speech bursts $SB_5$ and $SB_6$ accompanied by two reverberation signals $RB_3$ and $RB_4$. The two speech bursts $SB_5$ and $SB_6$ are assumed to arrive at array 100 from the Z direction while the reverberation signals $RB_3$ and $RB_4$ are assumed to arrive at the array 100 from the Y direction. FIG. 4b illustrates the output of the voice activity detector 120 indicating detected voice and silent segments of the audio signal energy envelope. FIG. 4c illustrates the output of estimator 130. FIG. 4d illustrates the position estimate generated by the decision logic 140 after filtering.

In this situation, although the reverberation signals may have low energy, the long delay of the reverberation signals $RS_3$ and $RS_4$ may result in the decision logic 140 selecting the direction of the reverberation signals as the valid audio source location at the end of the speech bursts. This is due to the fact that even though the direct path audio signals having a higher energy for almost the entire duration of the speech bursts, the decaying tails of the speech bursts $SB_5$ and $SB_6$ fall below the energy level of the reverberation signals $RS_3$ and $RS_4$ resulting in the estimator 130 locking onto the Y direction if the delay path of the reverberation signals exceeds the decision logic threshold.

Figure 5:
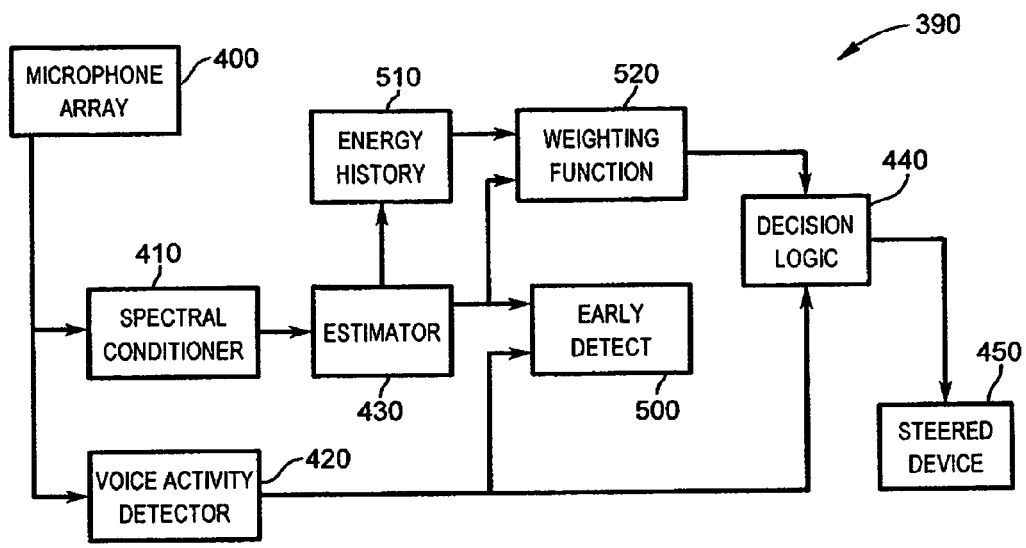
FIG. 5 is a schematic block diagram of a talker localization system that is robust in a reverberant environment in accordance with the present invention including an early detect module, an energy history module and a weighting function module.

Turning now to FIG. 5, a talker localization system that is robust in reverberant environments in accordance with the present invention is shown and is generally identified by reference numeral 390. As can be seen, talker localization system 390, similar to that of the previous embodiment, includes an array 400 of omni-directional microphones, a spectral conditioner 410, a voice activity detector 420, an estimator 430, decision logic 440 and a steered device 450.

However, unlike the talker localization system 90, talker localization system 390 further includes a mechanism to detect rapidly the direction of direct path audio and to weight position estimates output by the estimator. As can be seen, the mechanism includes an early detect module 500, an energy history module 510 and a weighting function module 520. Early detect module 500 receives the position estimates output by estimator 430 and the voice/silence decision logic output of the voice activity detector 420. Energy history module 510 communicates with the estimator 430. Weighting function module 520 receives the position estimates output by estimator 430 and the output of the early detect module 500. The output of the weighting function module 520 is fed to the decision logic 440 together with the output of the voice activity detector 420 to enable the decision logic 440 to generate audio source location position estimates.

The energy history module 510 accumulates output energy values for all beamformer instances of the estimator 130 in a circular buffer and thus, provides a history of the energy for a time interval T. Time interval T is sufficient so that energy values are kept for a period of time that is expected to be longer than the reverberation path in the room. The early detect module 500 calculates a position estimate for the direct path audio signal based on the rapid detection of a new speech burst presence. The weighting function module 520 performs weighting of the position estimates received from the estimator 130 and from the early detect module 500. The weighting is based on the energies of the relevant position estimates provided by the energy history module 510.

The early detect module 500, energy history module 510 and weighting function module 520 allow the talker localization system 390 to determine reliably audio source location in reverberant environments. Specifically, the early detect module 500, energy history module 510 and weighting function module 520 exploit the fact that when a silence period is interrupted by a speech burst, the direct path audio signal arrives at the array 100 before the reverberation signals. If the direction of the direct path audio signals is determined on a short time interval relative to the delay of the reverberation signals, then the correct audio source location can be identified at the beginning of the speech burst. Once the early detection of the direct path audio signal direction is complete, the position estimates output by estimator 130 are weighted through the weighting function module 520 based on the output energy of the corresponding beamformer. Thus, the location corresponding to the early detect position estimate generated by the early detect module 500 is assigned a higher weight than all others. The energy of the reverberation signals even in the highly reverberant rooms rarely exceeds the energy of the direct path audio signal. As a result, the reverberation signals are filtered out by the weighting function module 520.

Figure 6:
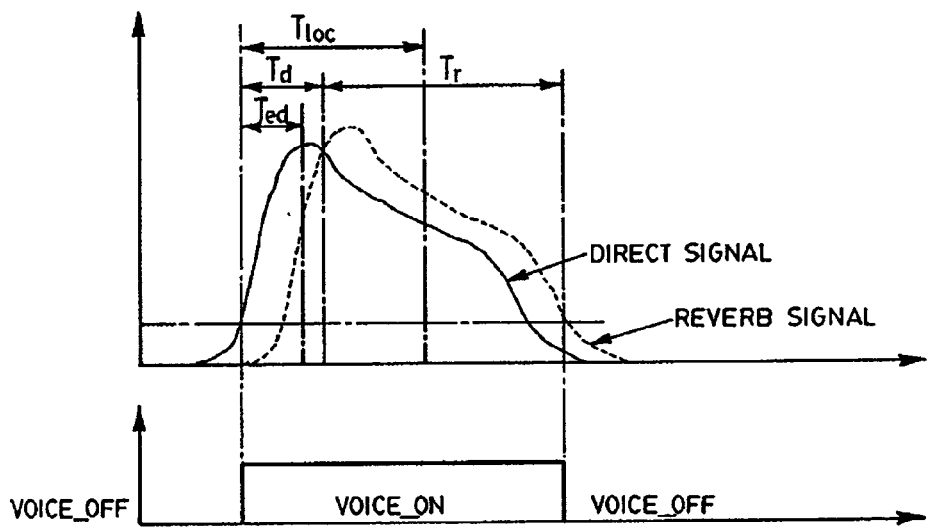
FIG. 6 is a timing diagram for direct path audio signals and reverberation signals and voice activity detection.

FIG. 6 is a timing diagram for a direct path audio signal and a reverberation signal together with voice activity detection, where:

$T_d$ is the time interval when the direct path audio signal has dominant energy;

$T_r$ is the time interval when the reverberation signal has dominant energy;

$T_{loc}$ is the minimum time interval required for an audio source to have dominant energy in order for the decision logic 440 to yield a position estimate; and $T_{ed}$ is the minimum time interval required for an audio signal to have dominant energy in order for the early detect module 500 to yield a position estimate.

Figure 7:
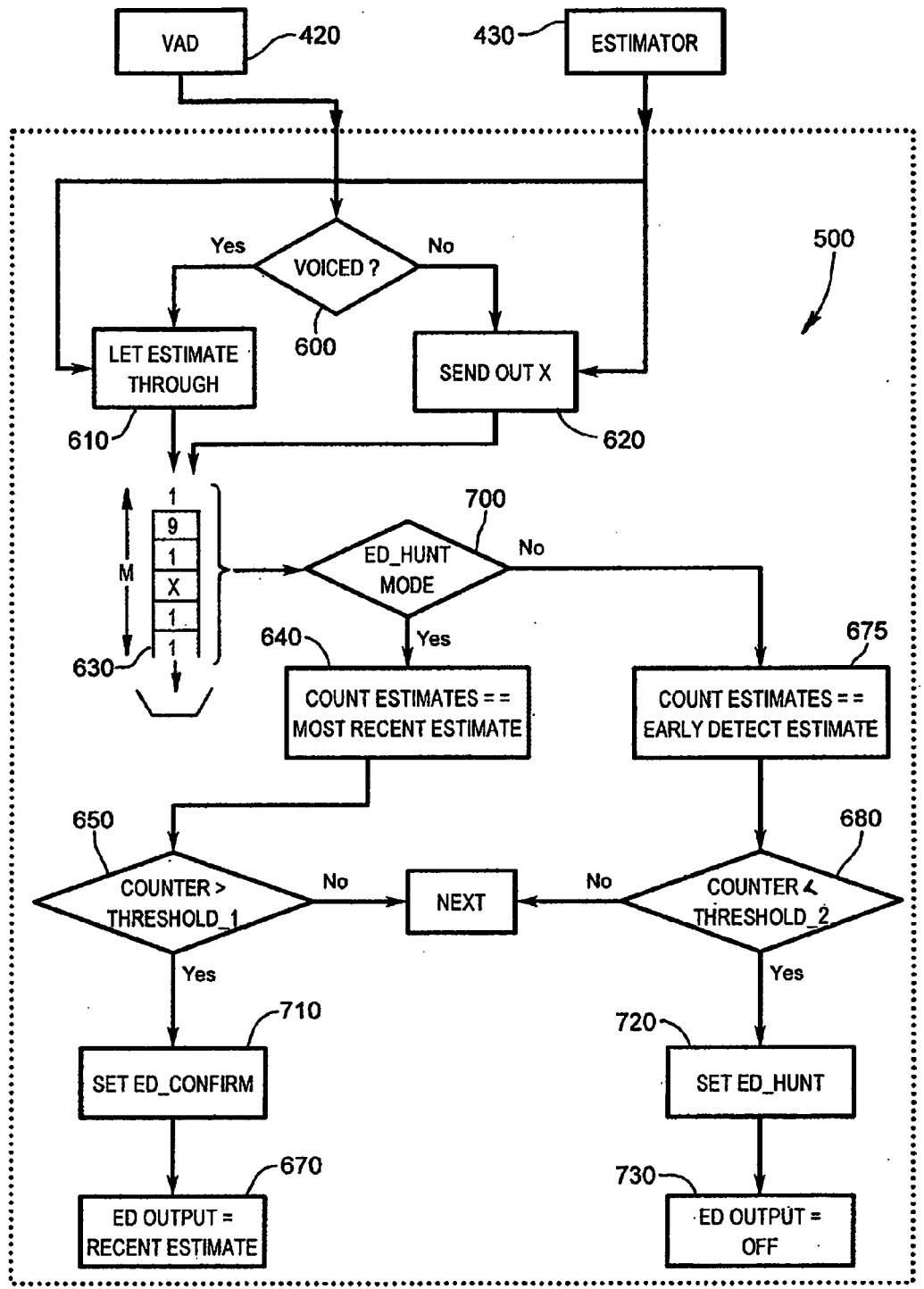
FIG. 7 is a state machine of the early detect module shown in FIG. 5.

The early detect module 500 operates on principles similar to those of the decision logic 440. Specifically, the early detect module 500 is a state machine that combines the output of the voice activity detector 420 and the estimator 430 as shown in FIG. 7. The early detect module 500 accumulates a number of position estimates provided by the estimator 430 (step 610) and stores the position estimates in a FIFO stack memory (step 630). A check is then made to determine if the early detect module 500 is in a hunt state (step 700). If so, the early detect module 500 waits for the localization algorithm of the estimator 430 to repeat its estimation a predetermined number of times (M) out of a total accumulated estimates (N) (step 640). The early detect module 500 disregards the position estimates during speech pauses (steps 600 and 620). The numbers N and M are significantly smaller than the corresponding numbers in the decision logic 440. Typically the decision logic 440 yields a final position estimate after a duration $Tl_{oc}$=30–40 ms. The early detect module 500 provides its position estimate after a duration $T_{ed}$=10–15 ms.

A counter 650 counts how many times the latest position estimate has occurred in the past within the size restriction M. When the current position estimate has occurred more than a first threshold number of times, the state of the early detect module 500 is set to a confirm state (step 710) and the early detect position estimate is output (step 670).

At step 700, if the early detect module 500 is in the confirm state (i.e. the early detect module 500 has previously determined an early detect position estimate), a counter 680 counts additional occurrences of the early detect position estimate (step 675). In this state, when the early detect position estimate occurs less than a second threshold number of times within a predetermined window, the state of the early detect module 500 is changed back to the hunt state (step 720) and the output of the early detect module 500 to the weighting function module 52 is turned off (step 730).

The weighting function module 520 is responsive to the early detect module output state. When the early detect module 500 is not in the confirm state (i.e. it does not have a valid position estimate at its output), the weighting function module 520 is transparent meaning that the output of the estimator 430 is passed directly to the decision logic 440. When the early detect module 500 is in the confirm state and has a valid position estimate at its output, the weighting function module 520 generates position estimates (PE) as following:

$$PE = \begin{cases} EST, & \text{if } \text{Energy}[EST] > k * \max\{\text{Energy}[ED\_EST]\}, \\ ED\_EST, & \text{otherwise} \end{cases}$$

where:

Energy[EST] is the energy of the beamformer instance positioned in the direction of the position estimate at the output of the estimator 430;

max{Energy[ED EST]} is the maximum energy of the beamformer instance positioned in the direction of the position estimate generated by the early detect module 500 over a time interval T (Interval T is significant to accommodate for the longest expected delay due to reverberations signals); and k is the weighting coefficient (value less than 1, depends on the reverberant conditions).

Figure 8:
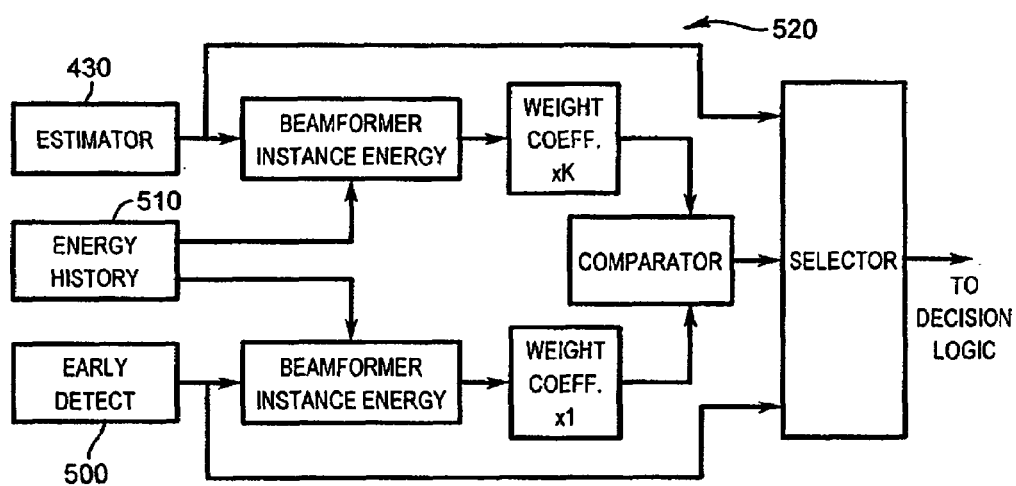
FIG. 8 is a schematic block diagram of the weighting function module shown in FIG. 5.

FIG. 8 is a state machine of the wieghting function module 520.

Figure 9:
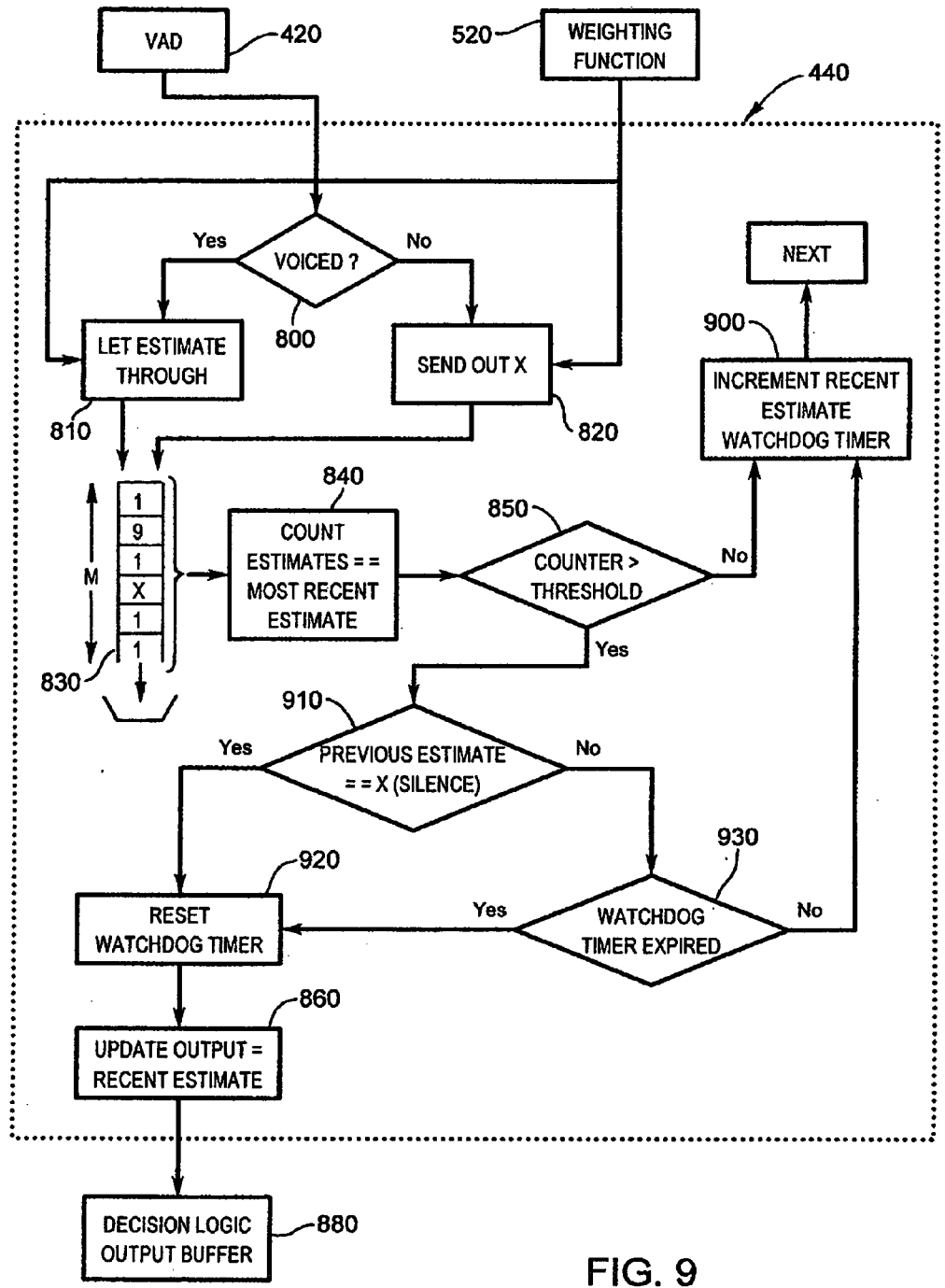
FIG. 9 is a state machine of the decision logic forming part of the talker localization system of FIG. 5.

FIG. 9 better illustrates the decision logic 440 and as can be seen, decision logic 440 is a state machine that uses the output of the voice activity detector 420 to filter the position estimates received from the weighting function 520. Decision logic 440 is similar to decision logic 140 but further includes a mechanism to inhibit its final position estimate output from switching direction if no interval of silence separates a change in position estimates received from the weighting function 520. The position estimates received by the decision logic 440 when the voice activity detector 420 generates silence decision logic output are disregarded (steps 800 and 820). Position estimates received by the decision logic 440 when the voice activity detector 420 generates voice decision logic output are stored (step 810) and are then subjected to a verification process. During the verification process, the decision logic 440 waits for the estimator 430 to complete a frame and repeat its position estimate a predetermined number of threshold times.

A FIFO stack memory 830 stores the position estimates. A counter 840 counts how many times the latest position estimate has occurred in the past within the size restriction N of the FIFO stack memory 830. At each count, a watchdog timer is incremented (step 900). The period of the watchdog timer is set to value that is expected to be longer than the delay of the reverberation signal path. If the current position estimate has occurred more than M times, the current position estimate is verified provided the current position estimate repeats for a time interval that is longer than the delay of the reverberation path (step 910). If the time interval of the current position estimate is longer than that delay of the reverberation path, the watchdog timer is reset (step 920), the final position estimate is updated (860) and is stored in a buffer (step 880).

If the time interval of the current position estimate is less than the period of the watchdog timer, which is expected to be more than delay of the reverberation path, the watchdog timer is examined (step 930) to determine if it has expired. If so, the watchdog timer is reset (step 920) and the decision logic state machine proceeds to step 860. If the watchdog timer has not expired, the watch dog timer is incremented (step 900).

As will be appreciated, the watchdog timer is only activated if new position estimates follow a previous position estimate without any interval of silence therebetween. This inhibits an extra delay in localization during the new speech burst and thus, preserves fast reaction on new speech bursts while avoiding any extraneous switching due to long delay reverberation signals. FIG. 10e illustrates the timing of the watchdog timer and FIG. 10f illustrates the decision logic output in response to the watchdog timer and to the signals of FIGS. 10a to 10d.

Although the talker localization system is described as including both the mechanism to detect rapidly the direction a speech burst and the mechanism to inhibit position estimate switching in the event of reverberation signals with long delay paths, those of skill in the art will appreciate that either mechanism can be used in a talker localization system to improve talker localization in reverberant environments.

Although a preferred embodiment of the present invention has been described, those of skill in the art will appreciate that variations and modifications may be made without departing from the spirit and scope thereof as defined by the appended claims.

What is claimed is:

1. A method of locating a talker in a reverberant environment comprising the steps of:
   receiving multiple audio signals from a microphone array, said audio signals including direct path audio signal and reverberation signal components;
   calculating position estimates of a source of said audio signals based on said audio signals;
   rapidly detecting the direction of the direct path audio signal component of said multiple audio signals based on said calculated position estimates;
   using the rapidly detected direction to weight the calculated position estimates;
   detecting periods of speech activity; and
   generating a final position estimate of said source during said periods of speech activity based on the weighted position estimates,
   wherein the direction of the direct path audio signal component is detected based on the earliest calculated position estimates,
   wherein the direction of the direct path audio signal is detected over a duration equal to approximately 10 to 15 msec.,
   wherein the direction of the direct path audio signal component is detected by: (i) storing a succession of calculated position estimates; (ii) counting occurrences of the calculated position estimates during periods of speech activity; and (iii) determining the direction of the direct path audio signal component when a current calculated position estimate occurs more than a threshold number of times, and
   wherein calculated position estimates are not weighted when the direction of the direct path audio signal component is not detected within said duration.

2. The method of claim 1 wherein said calculated position estimates are weighted according to:

$$PE = \begin{cases} EST, & \text{if } Energy[EST] > k * \max\{Energy[ED\_EST]\}, \\ ED\_EST, & \text{otherwise} \end{cases}$$

where:
   Energy[EST] is the energy of beamformer instances positioned in the direction of the calculated position estimates;
   max{Energy[ED_EST]} is the maximum energy of the beamformer instances positioned in the direction of the calculated position estimates over the duration; and
   k is the weighting coefficient having a value less than 1.

3. The method of claim 1 further comprising the step of verifying the weighted calculated position estimates thereby to generate said final position estimate.

4. The method of claim 3 wherein said verifying further includes the step of storing a succession of weighted position estimates, counting occurrences of said weighted position estimates during periods of speech activity and within a window and selecting the weighted position estimate that is repeated more than a threshold number of times within said window.

5. The method of claim 4 further comprising the step of discarding weighted position estimates calculated during periods where there is no speech activity.

6. The method of claim 1 wherein the calculated position estimates are based on output energy values of beamformers processing the audio signals received from said microphone array and wherein said weightings are based on accumulated values over a time interval T.

7. A method of locating a talker in a reverberant environment comprising the steps of:
- receiving multiple audio signals from a microphone array, said audio signals including direct path audio signal and reverberation signal components;
- calculating position estimates of a source of said audio signals based on said audio signals;
- rapidly detecting the direction of the direct path audio signal component of said multiple audio signals based on said calculated position estimates;
- using the rapidly detected direction to weight the calculated position estimates;
- detecting periods of speech activity; and
- generating a final position estimate of said source during said periods of speech activity based on the weighted position estimates, wherein the calculated position estimates are based on output energy values of beamformers processing the audio signals received from said microphone array and wherein said weightings are based on accumulated values over a time interval T, and wherein said calculated position estimates are weighted according to:

$$PE = \begin{cases} EST, & \text{if } \text{Energy}[EST] > k * \max\{\text{Energy}[ED\_EST]\}, \\ ED\_EST, & \text{otherwise} \end{cases}$$

where:
- Energy[EST] is the energy of beamformer instances positioned in the direction of the calculated position estimates;
- max{Energy[ED_EST]} is the maximum energy of the beamformer instances positioned in the direction of the calculated position estimates over the duration; and
- k is the weighting coefficient having a value less than 1.

8. The method of claim 7 wherein said time interval T is sufficient so that energy output values are accumulated for a period of time expected to be longer than the path of said reverberation signal components.

9. The method of claim 7 further comprising the step of inhibiting the final position estimate from being changed if no interval of silence separates the weighted position estimates.

* * * * *